Patented Jan. 12, 1932

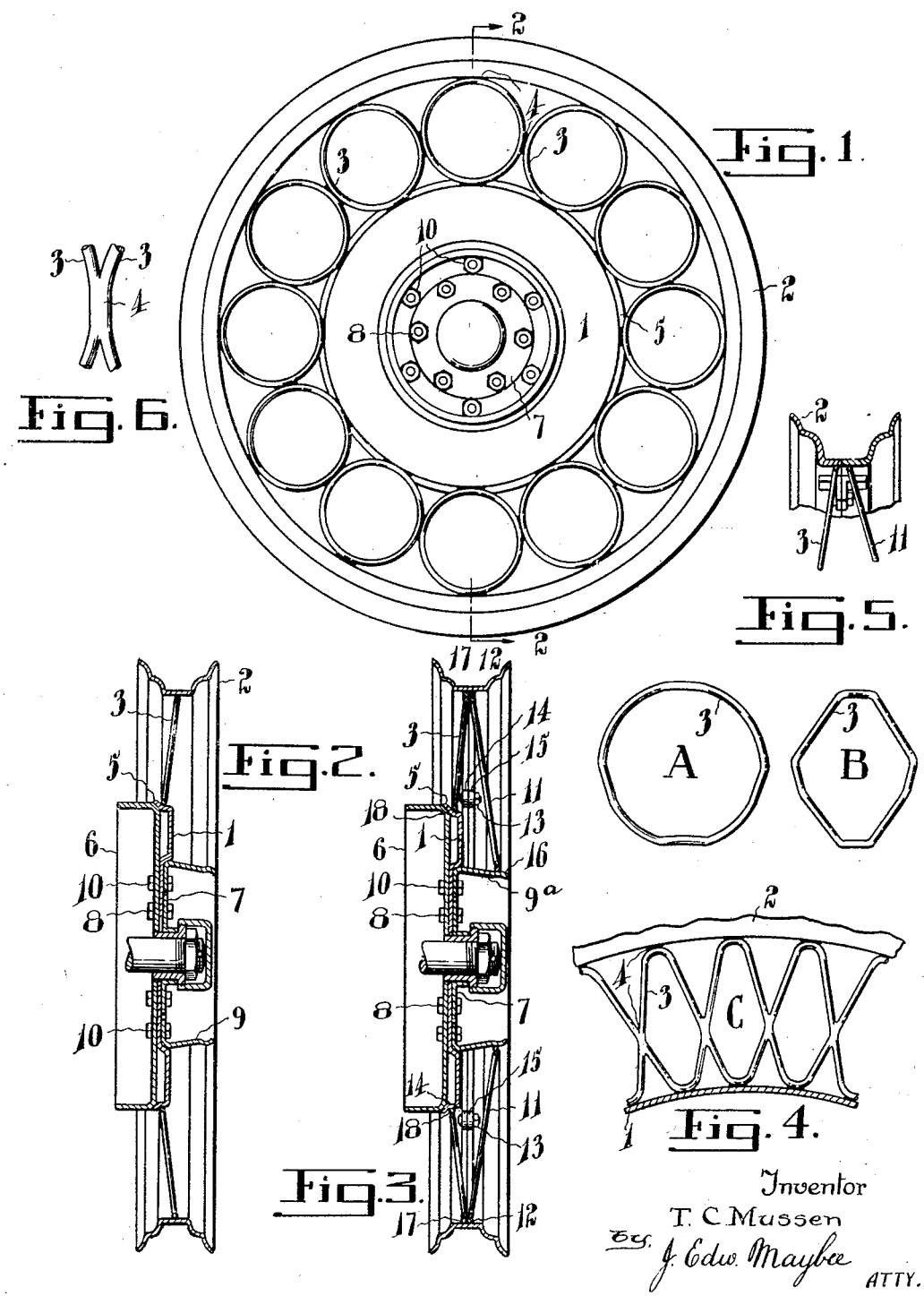

1,841,047

UNITED STATES PATENT OFFICE

THOMAS CHARLES MUSSEN, OF TORONTO, ONTARIO, CANADA

VEHICLE WHEEL

Application filed December 31, 1930. Serial No. 505,840.

This invention relates to wheels for motor cars and similar vehicles. In the event of a wheel of the disk type becoming deformed through violently striking a curb, for example, it is possible to have the wheel reshaped by subjecting it to the action of a suitable shaping press. A preference exists at the present time, however, for wheels of the wire spoke type. These wire spoke wheels, when deformed, cannot be reshaped in the ordinary manner, but must be rebuilt or replaced with a new wheel. An objection to the ordinary solid disk wheels is that they make it rather difficult to steer the vehicle in windy weather due to the wind being unable to get through the wheel. A further objection to the solid disk wheel is that they create a humming sound which is also due to the wind being unable to get through the wheel.

My object therefore, is to devise a wheel construction which will have the advantages of the disk wheel as far as reshaping is concerned, but which will not possess the disadvantage above referred to in regard to steering and noise, and which at the same time will also have the advantages of wheels of the wire spoke type, and which will possess great strength and in which therefore the liability to deformation due to jars is largely obviated. A further object is to devise a wheel which may be very readily cleaned, and a still further object is to attain the above results in a wheel which may be manufactured at a very reasonable cost.

I attain my object by means of the constructions hereinafter described and illustrated in the accompanying drawings in which Fig. 1 is a side elevation of my improved wheel;

Fig. 2 a section on the line 2—2 in Fig. 1;

Fig. 3 a view similar to Fig. 2 but illustrating a wheel intended for heavier work;

Fig. 4 details illustrating modified shapes of spokes;

Fig. 5 a detail showing a modification of the construction shown in Fig. 3; and

Fig. 6 a detail showing a modified joint between the spokes shown in Fig. 1.

In the drawings like numerals of reference indicate corresponding parts in the different figures.

The wheel comprises a hub portion 1 formed as a metal stamping, a rim 2, and spokes connecting the rim and hub. In the preferred construction shown in Figs. 1 and 2, the spokes are formed of a series of rings 3 welded to the hub portion and rim and also to one another at 4. Where welding is effected by the application of additional metal, the rings may be true circles as shown in Fig. 1, but where welding is effected by a fusing of the metal of the spokes, in order to give a greater bearing surface between the spoke and the parts to which it is connected, the spoke unit will preferably be formed in accordance with specimen A in Fig. 4, and the weld at 4 will appear as shown in Fig. 6.

While the spokes may be vertically arranged, I prefer to incline them slightly relative to the vertical plane as shown in Fig. 2 to give the wheel a dished effect and also to give it additional strength. It will also be noted that the hub 1 is formed with an annular shoulder 5, which assists in positioning the spokes during the manufacture of the wheel, and also helps to retain the hub ends of the spokes in position under strain.

While the circular or substantially circular form of spoke is preferable, it is evident that a substantially octagon form of spoke as shown in specimen B, in Fig. 4, will answer the purpose quite well. A further modified spoke arrangement is shown in specimen C in Fig. 4, in which two sets of spokes are employed each set being formed by bending a bar in opposite directions, and superimposing the sets one on the other, the bends being arranged in staggered relationship and welding the spokes together where they cross one another thus forming a series of substantially diamond-shaped openings. With this latter form of spoke, the spokes where they cross one another will preferably be welded by fusing, so as to force the spokes of one series into line with those of the other series.

The arrangement of the hub section to position it upon the axle may be varied to suit any of the standard methods of applying wheels to axles, and it will be understood that I am not to be limited in any way to the method shown of mounting the wheel on the axle.

In the drawing I show the hub portion having a brake drum 6 within the same, and a flanged ring 7 outside, the three parts being secured together by bolts 8. The wheel is keyed to the axle in an ordinary way.

It is also usual in present day practice to employ a large hub cap, and I therefore preferably secure to the hub an extension 9 by bolts 10. In the simple type of wheel shown in Fig. 2, this extension 9 is only really for show purposes and to carry the cap, and as it is not subjected to any strain, it may be of comparatively light metal.

In Fig. 3, I show a wheel devised for heavier work. The construction is substantially the same as that shown in Fig. 2 with the exception that in this case the extension 9ª must be of strong material. The spokes 11 of a second set have their inner ends welded to the extension 9ª and their outer ends to a removable ring section 12 of the rim, which may be secured in place in any desired way, for example by bolts 13 extending through holes in alined lugs 14 and 15 on the rim and ring respectively. The extension 9ª is upset at its outer end to form a shoulder 16 against which the inner parts of the spokes may abut. In this arrangement the extension 9ª, spokes 11 and ring 12 will be made up into a unitary construction and may be substituted on the wheel shown in Fig. 2 for the extension 9. To facilitate manufacture I may first secure the spokes 3 into a separate assembly. This may be done by welding the outer ends of the spokes to a ring 17 and the inner ends to a ring 18. The spoke assembly is then secured in place by welding or otherwise securing the outer ring 17 to the rim and similarly securing the inner ring 18 to the hub. This arrangement may also be carried out in connection with the construction shown in Figs. 2 and 5.

In Fig. 5 a different method of dividing the rim in the heavy duty wheel is shown. The rim is divided substantially in halves and one ring of spokes has its outer portions welded to one half of the rim and the other ring of spokes to the outer side of the rim.

It will be evident, of course, that a very strong wheel could be obtained without being divided as shown, but I prefer, however, to arrange the wheels so that one row of spokes is removable.

It will be evident that, as all the spokes are arranged in a line, the wheel shown in Fig. 2 may, if it becomes deformed, conveniently be placed in a press and reshaped. So too with the wheel shown in Figs. 3 and 5, the removable section may be removed, and each section independently reshaped in a suitable press.

While I prefer to weld the various parts of the wheel together, it will be evident of course, that the spokes may be secured to the rim and hub by other means such as bolts or rivets.

While the wheel is not intended to be in any case a "spring wheel" and would not relieve any jar on the vehicle under any ordinary riding conditions, it will be evident that with the spokes arranged as shown, that under great stress there will be sufficient resiliency in the wheel to prevent collapse.

What I claim as my invention is:

1. In a vehicle wheel, the combination with a hub and rim of a series of wire spokes, said spokes being arranged in the form of a series of closed geometrical figures welded at their outer and inner ends to the rim and hub respectively and at their sides to adjacent spokes, the inner ends of the spokes being welded to the hub in substantially the same plane and the outer ends of the spokes welded to the rim in substantially the same plane.

2. In a vehicle wheel, the combination with a hub and rim of a series of spokes, said spokes being arranged in the form of a series of closed geometrical figures, a ring welded to the outer ends of said spokes; a ring welded to the inner ends of said spokes, said rings being connected respectively to the rim and hub.

Signed at the city of Toronto, Canada, this 27th day of December, 1930.

THOMAS CHARLES MUSSEN.